(12) United States Patent
Aiura et al.

(10) Patent No.: US 12,039,655 B2
(45) Date of Patent: Jul. 16, 2024

(54) RESOURCE ESTIMATION APPARATUS, RESOURCE ESTIMATION METHOD AND PROGRAM

(71) Applicant: Nippon Telegraph and Telephone Corporation, Tokyo (JP)

(72) Inventors: Daishi Aiura, Musashino (JP); Hiroki Iwasawa, Musashino (JP); Kenta Kawakami, Musashino (JP); Takeshi Kuwahara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 99 days.

(21) Appl. No.: 17/802,394

(22) PCT Filed: Feb. 28, 2020

(86) PCT No.: PCT/JP2020/008515
§ 371 (c)(1),
(2) Date: Aug. 25, 2022

(87) PCT Pub. No.: WO2021/171615
PCT Pub. Date: Sep. 2, 2021

(65) Prior Publication Data
US 2023/0169712 A1    Jun. 1, 2023

(51) Int. Cl.
*G06T 15/00* (2011.01)
(52) U.S. Cl.
CPC ................ *G06T 15/005* (2013.01)
(58) Field of Classification Search
None
See application file for complete search history.

(56) References Cited

U.S. PATENT DOCUMENTS

| 2017/0139738 A1* | 5/2017 | Kim | G06F 9/452 |
| 2017/0178408 A1* | 6/2017 | Bavor, Jr. | G06T 19/006 |

(Continued)

OTHER PUBLICATIONS

Valve Corporation, "Onward," Steam, Aug. 30, 2016, retrieved from URL <https://store.steampowered.com/app/496240/Onward/>, 9 pages (with English Translation).

(Continued)

*Primary Examiner* — James A Thompson
(74) *Attorney, Agent, or Firm* — Fish & Richardson P.C.

(57) ABSTRACT

A resource estimation device is configured to estimate a resource for a virtual terminal. The resource estimation device includes: a resource estimation unit configured to calculate a resource value corresponding to a VR image output scheme and a characteristic value of 3D data, using resource relation information, the resource value causing the virtual terminal to operate at the characteristic value, the VR image output scheme being a scheme for outputting the VR image and being input, the 3D data being data about an object that is drawn by a VR application program, the resource relation information being set for each VR image output scheme and indicating a relation about change between the characteristic value and the resource value, and configured to calculate the resource value as the resource necessary for the virtual terminal; and a relation correction unit configured to alter the resource value included in the resource relation information.

5 Claims, 7 Drawing Sheets

(56) References Cited

U.S. PATENT DOCUMENTS

| | | | | |
|---|---|---|---|---|
| 2017/0249920 A1* | 8/2017 | Cook | | G09G 5/363 |
| 2019/0385379 A1* | 12/2019 | Woo | | G01C 21/3626 |
| 2020/0098078 A1* | 3/2020 | Bujewski | | G06T 1/20 |
| 2020/0374242 A1* | 11/2020 | Xu | | H04N 21/816 |
| 2021/0374782 A1* | 12/2021 | Huston | | H04W 4/21 |
| 2022/0358730 A1* | 11/2022 | Otsuki | | H04N 21/6587 |

OTHER PUBLICATIONS

Valve Corporation, "VersaillesVR, the Palace is yours," Steam, Sep. 11, 2019, retrieved from URL <https://store.steampowered.com/app/1098190/VersaillesVR_the_Palace_is_yours/>, 9 pages (with English Translation).

* cited by examiner

RESOURCE ESTIMATION APPARATUS, RESOURCE ESTIMATION METHOD AND PROGRAM

CROSS-REFERENCE TO RELATED APPLICATIONS

This application is a National Stage application under 35 U.S.C. § 371 of International Application No. PCT/JP2020/008515, having an International Filing Date of Feb. 28, 2020. The disclosure of the prior application is considered part of the disclosure of this application, and is incorporated by reference in its entirety into this application.

TECHNICAL FIELD

The present invention relates to a resource estimation device, a resource estimation method and a resource estimation program.

BACKGROUND ART

In a VR service that provides a VR (Virtual Reality) image, a VR rendering machine that performs the rendering (generation) of the VR image by executing a VR application program and a VR terminal for viewing the VR image are used.

In the VR service, an extra-low-delay property is required for a so-called MTP (Motion to Photon) delay, which is a delay after the VR terminal detects the action of a VR viewer and sends displacement information indicating the orientation of the VR viewer and the displacement in the action to the VR application program and before the VR image corresponding to the displacement information is displayed on the VR terminal.

Therefore, for viewing a high-quality and high-end VR, an on-premises environment in which the VR rendering machine is disposed at a viewing spot for the VR image and the VR rendering machine and the VR terminal are connected directly or closely by HDMI (High-Definition Multimedia Interface) or Wi-Fi is employed.

Meanwhile, the provision of the VR service in a cloud environment has been discussed. However, in the case where the on-premises environment is shifted to the cloud environment with no change, the VR rendering machine is disposed in the cloud, and therefore, it is difficult to realize the MTP delay having a required very-low-delay property, due to the influence of a communication network such as the internet that connects the VR rendering machine and the VR terminal.

CITATION LIST

Non-Patent Literature

Non-Patent Literature 1: "SteamVR, System Requirement", STEAM, [searched Feb. 19, 2020], Internet <URL: https://store.steampowered.com/app/1098190/VersaillesVR_the_Palace_is_yours/>

Non-Patent Literature 2: "SteamVR, System Requirement", STEAM, [searched Feb. 19, 2020], Internet <URL: https://store.steampowered.com/app/496240/Onward/>

SUMMARY OF THE INVENTION

Technical Problem

Hence, in the present invention, it is assumed to provide an edge cloud platform on which the rendering of the VR image is performed in real time using a low-delay cloud based on a MEC (Multi-access Edge Computing) technology, and a machine resource necessary on the edge cloud is studied. That is, the present invention assumes that the VR rendering machine is disposed at an edge of the cloud, and estimates a machine resource necessary to realize the real-time VR rendering on the VR rendering machine in the edge cloud environment.

Usually, in the VR application program, a recommended performance value of the machine resource necessary for the rendering of the VR image is presented in a specification document (Non-Patent Literatures 1 and 2). Therefore, a user of the VR application program can prepare and introduce a VR rendering machine based on the recommended performance value.

Further, a developer of the VR application program can cause the VR application program in the experimental stage to operate on an already-existing machine owned by the developer, and can adjust the load that the VR application program requires for the machine, depending on the smoothness of the motion of the VR image, and the like.

However, for a cloud provider that provides the cloud platform for VR, both are difficult. The reason is because the cloud provider cannot know the magnitude of the load that is given to the recommended machine by the VR application program although the recommended performance value of the machine resource is presented for each VR application program. Further, for causing a plurality of VR application programs to efficiently operate on a single machine, it is necessary to assume the magnitudes of the loads of the VR application programs on the machine resource of the machine by some kind of measure, and to appropriately assign machine resources to the VR application programs.

Therefore, the cloud provider needs to grasp whether the existing VR application programs operate on the existing VR rendering machine, and to determine the machine resources that are assigned to the VR application programs.

Further, because of the constraint of the MTP delay, in the cloud environment in which the delay is generated in the communication network, it is necessary to shorten the time for the rendering of the VR image, compared to the case where the delay is small, and it is necessary to provide an additional machine resource.

The present invention has been made in view of the above circumstances, and an object of the present invention is to provide a technology allowing the estimation of the resource of the machine that performs the rendering of the VR image.

Means for Solving the Problem

A resource estimation device in an aspect of the present invention is a resource estimation device that estimates a resource necessary for a virtual terminal, the resource estimation device being installed at a network system end of a communication network system, the virtual terminal performing rendering of a VR image, the resource estimation device including: an estimation unit configured to calculate a resource value corresponding to a VR image output scheme and a characteristic value of 3D data, using resource relation information, the resource value being necessary to cause the virtual terminal to operate at the characteristic value, the VR image output scheme being a scheme for outputting the VR image and being input, the 3D data being data about an object that is drawn by a VR application program, the resource relation information being set for each VR image output scheme and indicating a relation about change between the characteristic value and the resource value, and configured to calculate the calculated resource value as the resource necessary for the virtual terminal; and a correction unit configured to alter the resource value included in the resource relation information, depending on a predetermined delay time in a communication network between the resource estimation device and the VR terminal, when the communication network has the delay time.

A resource estimation method in an aspect of the present invention is a resource estimation method in which a resource estimation device estimates a resource necessary for a virtual terminal, the resource estimation device being installed at a network system end of a communication network system, the virtual terminal performing rendering of a VR image, the resource estimation method including: a step of calculating a resource value corresponding to a VR image output scheme and a characteristic value of 3D data, using resource relation information, the resource value being necessary to cause the virtual terminal to operate at the characteristic value, the VR image output scheme being a scheme for outputting the VR image and being input, the 3D data being data about an object that is drawn by a VR application program, the resource relation information being set for each VR image output scheme and indicating a relation about change between the characteristic value and the resource value, and calculating the calculated resource value as the resource necessary for the virtual terminal; and a step of altering the resource value included in the resource relation information, depending on a predetermined delay time in a communication network between the resource estimation device and the VR terminal, when the communication network has the delay time.

A resource estimation program in an aspect of the present invention is a resource estimation program that causes a computer to function as the above resource estimation device.

Effects of the Invention

According to the present invention, it is possible to provide the technology allowing the estimation of the resource of the machine that performs the rendering of the VR image.

DESCRIPTION OF EMBODIMENTS

An embodiment of the present invention will be described below with reference to the drawings. In the drawings, identical parts are denoted by identical reference characters, and descriptions thereof are omitted.

Figure 1:
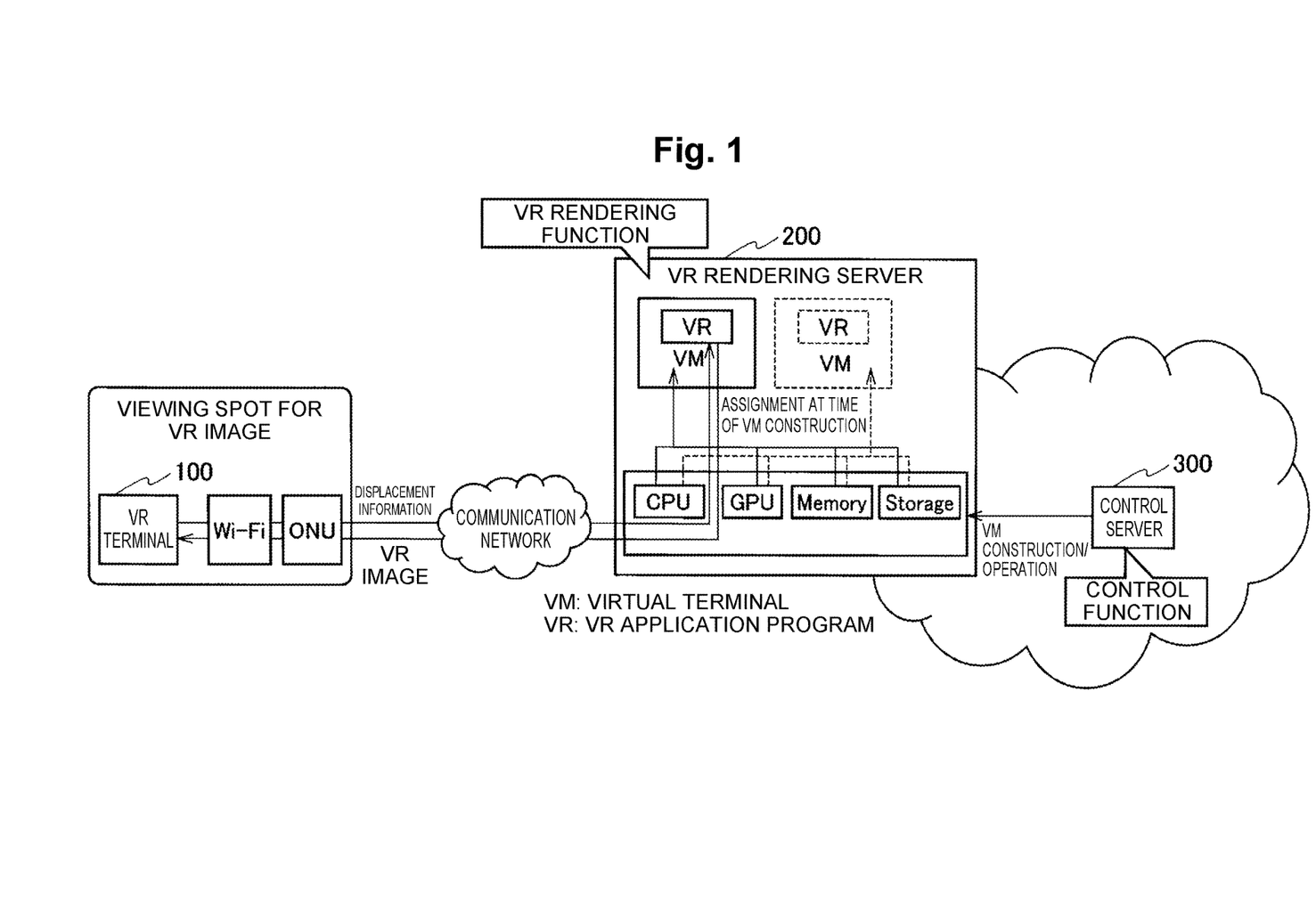
FIG. 1 is a diagram showing the whole image of a VR rendering scheme in an edge cloud environment.

FIG. 1 is a diagram showing the whole image of a VR rendering scheme in an edge cloud environment.

In the embodiment, the function of a VR rendering machine is divided into a VR rendering function to execute the rendering of a VR image and a control function to control the execution of the rendering of the VR image. The VR rendering function is disposed in a server (VR rendering server 200) installed at an edge (a network system end of a communication network system) of a cloud that is at a position physically close to a viewing spot for a VR image. The control function is disposed in a server (control server 300) installed within the cloud (within the communication network system). The control function may be disposed in another server installed at an edge of the above cloud in parallel, or may be disposed within the VR rendering server 200.

A cloud provider that provides a cloud platform for VR operates the VR rendering server 200 and the control server 300, and provides the VR rendering function from the VR rendering server 200 to a VR viewer. The VR rendering server 200 can construct various kinds of virtual terminals (also referred to as VMs (Virtual Machines)), and assigns a CPU utilization, a GPU utilization, a memory usage, a storage usage and the like to the virtual terminals at the time of the construction of the virtual terminals. For example, the VR rendering server 200 constructs a virtual terminal for a VR application program, in response to a request for the use of a VR service from the VR viewer.

At the viewing spot for the VR image, the VR viewer equips a VR terminal 100 and a network device (for example, an ONU (Optical Network Unit), Wi-Fi equipment and the like) for connection with the virtual terminal constructed in the interior of the VR rendering server 200. The VR viewer provides the VR application program to the VR rendering server 200, disposes the VR application program within the virtual terminal in advance, and causes the virtual terminal for the VR application program to operate, so that the VR viewer enjoys only the VR rendering function.

Figure 2:
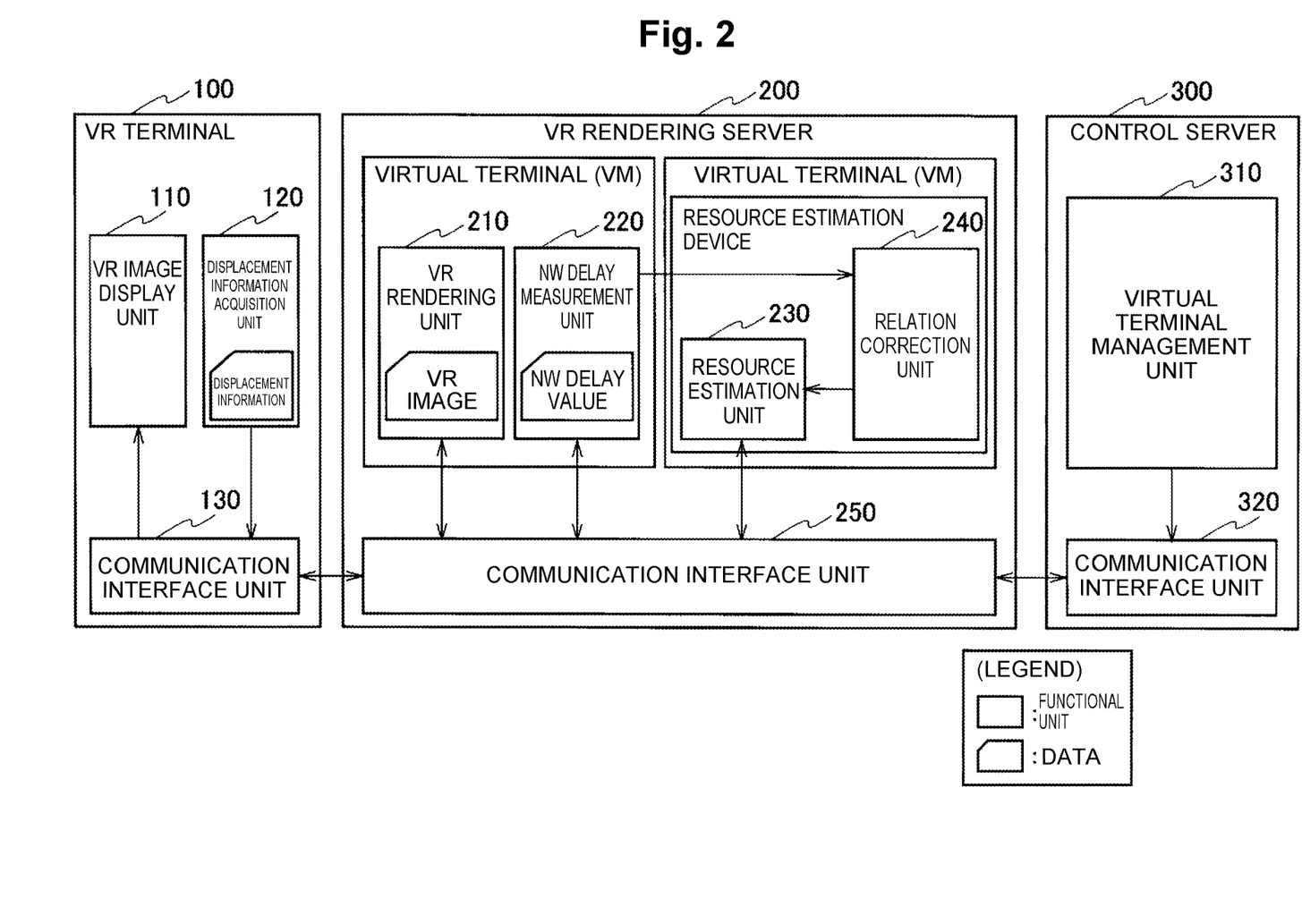
FIG. 2 is a diagram showing the functional configuration of the whole system.

FIG. 2 is a diagram showing the functional configuration of the whole system.

The system according to the embodiment includes the VR terminal 100, the VR rendering server 200 and the control server 300.

The VR terminal 100 is a terminal for viewing the VR image, and is disposed at the viewing spot for the VR image, for example, at VR viewer's home. For example, the VR terminal 100 can be realized by a head mounted display, a smartphone or the like. For example, the VR terminal 100 includes a VR image display unit 110 that displays the VR image received from the VR rendering server 200, a displacement information acquisition unit 120 that acquires displacement information indicating the displacement such as the orientation and position coordinate of the VR terminal 100 from a measurement mechanism within the VR terminal 100, and a communication interface unit 130 that sends the displacement information to the VR rendering server 200 and that receives the VR image corresponding to the displacement information from the VR rendering server 200.

The VR rendering server 200 is a server that is installed at the edge of the cloud, that executes the virtual terminal for the VR application program, and the like, and that performs the rendering of the VR image corresponding to the displacement information from the VR terminal 100 to send the VR image to the VR terminal 100. For example, the VR rendering server 200 can be realized by a general-purpose server such as an IA (Intel Architecture) server.

In the embodiment, in addition to the VR rendering function, the VR rendering server 200 further includes a resource estimation device 1 that estimates a machine resource necessary to realize a real-time VR rendering.

For example, the VR rendering server 200 includes a VR rendering unit 210 as a virtual terminal that performs the rendering of the VR image, a NW delay measurement unit 220 as a virtual terminal that measures a delay time in a communication network through which the VR rendering server 200 is connected with the VR terminal 100, a resource estimation unit 230 as a virtual terminal that estimates the machine resource necessary for the virtual terminal (VR rendering unit 210) that performs the rendering of the VR image, using previously set resource relation information, a relation correction unit 240 as a virtual terminal that corrects the resource relation information based on the delay time in the communication network, and a communication interface unit 250 that sends and receives a variety of data relevant to the VR service. The resource estimation unit 230 and the relation correction unit 240 constitutes the resource estimation device 1.

The control server 300 is a server that is installed within the cloud and that controls the execution of the rendering of the VR image by the VR rendering server 200. The control server 300 also can be realized by a general-purpose server. For example, the control server 300 includes a virtual terminal management unit 310 that manages each virtual terminal constructed within the VR rendering server 200 and a communication interface unit 320 that sends and receives a variety of data relevant to the VR service.

Figure 3:
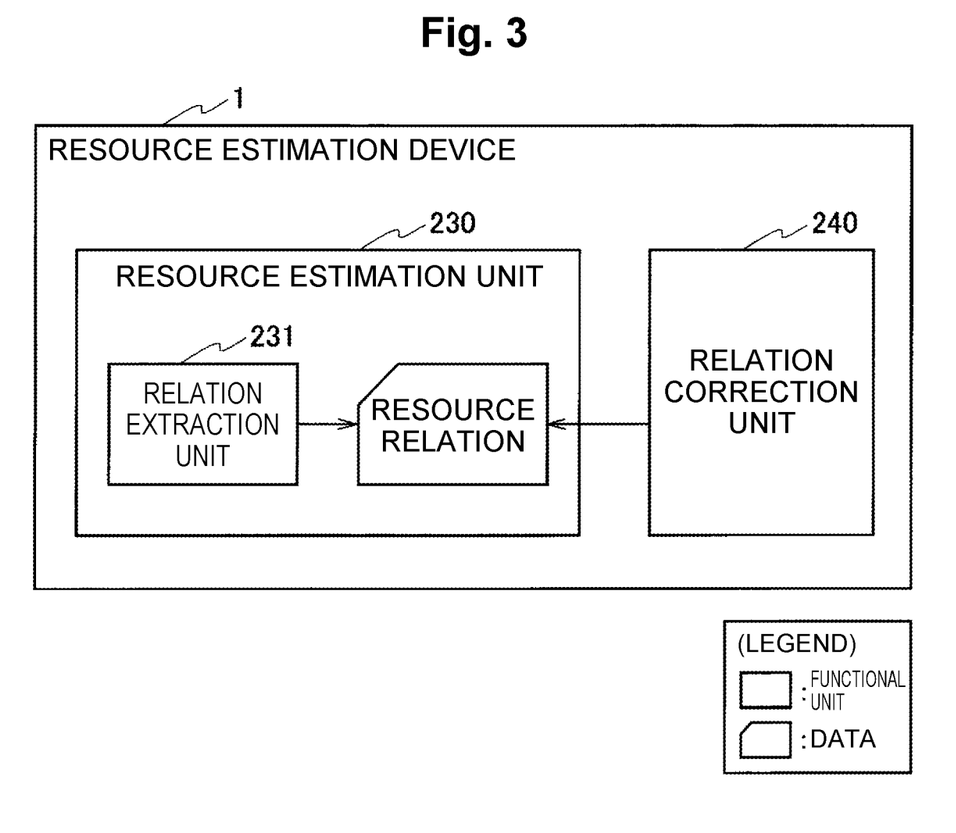
FIG. 3 is a diagram showing the functional configuration of a resource estimation device.

FIG. 3 is a diagram showing the functional configuration of the resource estimation device 1. The resource estimation device 1 includes the resource estimation unit 230 and the relation correction unit 240.

The resource estimation unit (estimation unit) 230 includes a relation extraction unit 231. The resource estimation unit 230 has a function to estimate a machine resource described below, based on the characteristic value of 3D data that is drawn by the VR application program provided by the VR viewer and a VR image output scheme designated by the VR viewer, using the resource relation information extracted by the relation extraction unit 231. The machine resource described below is a machine resource necessary to perform the rendering of the VR image in the virtual terminal (VR rendering unit 210) corresponding to the VR application program.

The relation extraction unit 231 has a function to extract the resource relation information corresponding to a predetermined VR image output scheme and indicating the relation about change between the characteristic value of the 3D data that is drawn by the VR application program and the machine resource necessary for the virtual terminal (VR rendering unit 210) depending on the characteristic value.

Specifically, the resource estimation unit 230 calculates a machine resource value corresponding to the input VR image output scheme and the characteristic value of the 3D data, using the resource relation information set for each VR image output scheme for outputting the VR image and indicating the relation about change between the characteristic value of the 3D data about an object that is drawn by the VR application program and the machine resource value necessary to cause the virtual terminal (VR rendering unit 210) to operate at the characteristic value, and calculates the calculated machine resource value as the machine resource necessary for the virtual terminal.

For example, the characteristic value of the 3D data is a draw call number or a primitive number. The draw call is a drawing command that is issued from a CPU to a GPU for each object having the same property. The primitive is information indicating a minimum unit constituting an object that is drawn, as exemplified by a point, a line and a polygon (triangle). For example, the machine resource value is a CPU clock number or a GPU utilization. For example, the VR image output scheme is a resolution or a frame rate.

The relation correction unit (correction unit) 240 has a function to correct (alter) the above resource relation information, in light of the influence of the delay in the communication network through which the VR rendering server 200 is connected with the VR terminal 100. Specifically, when the communication network between the VR rendering server 200 (resource estimation device 1) and the VR terminal 100 has a predetermined delay time, the relation correction unit 240 alters the machine resource value included in the resource relation information, depending on the delay time.

Figure 4:
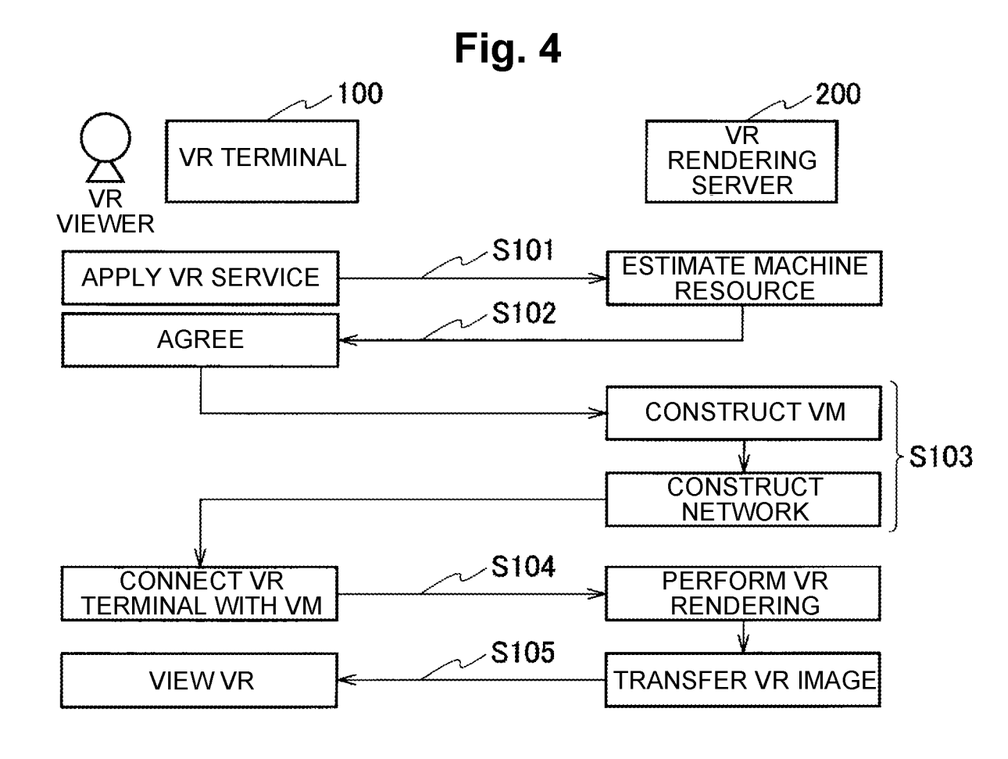
FIG. 4 is a diagram showing a processing flow of a VR service.

FIG. 4 is a diagram showing a processing flow of the VR service.

Step S101;

The VR viewer sends the VR application program (or the source code of the VR application program), the draw call number, the primitive number and others, to the VR rendering server 200, and designates the resolution, frame rate and others of the VR image, using a VR viewer's PC.

Step S102;

The VR rendering server 200 calculates (estimates) the machine resource necessary to perform the rendering of the VR image in the virtual terminal (VR rendering unit 210) corresponding to the VR application program, based on the above data from the VR viewer. Thereafter, the VR rendering server 200 determines whether the estimated machine resource can be assigned to the virtual terminal, and gives an answer about whether the VR service can be provided and a usage fee when the VR service can be provided.

Step S103;

After obtaining the agreement on the use of the VR service from the VR viewer, the VR rendering server 200 constructs the above virtual terminal and assigns the estimated machine resource to the virtual terminal. Then, the VR rendering server 200 constructs a network such that the communication with the virtual terminal can be performed (for example, the VR rendering server 200 newly provides, tests and establishes a communication channel toward the newly constructed virtual terminal), and gives a notice of the completion of a preparation for providing the VR service, to the VR viewer. Thereafter, the VR rendering server 200 stands by in a state of waiting for the connection with the VR terminal 100.

Step S104;

The VR terminal 100 is connected with the virtual terminal in the VR rendering server 200, detects the action of the VR viewer, and sends the displacement information indicating the orientation of the VR viewer and the displacement of the action, to the virtual terminal.

Step S105;

The virtual terminal of the VR rendering server 200 performs the rendering of the VR image corresponding to the displacement information, and delivers the VR image after the rendering, to the VR terminal 100.

Subsequently, step S104 to step S106 are repeatedly performed whenever the VR terminal 100 detects the action of the VR viewer. Thereby, the VR viewer can view the VR image depending on the orientation of the VR viewer.

Figure 5:
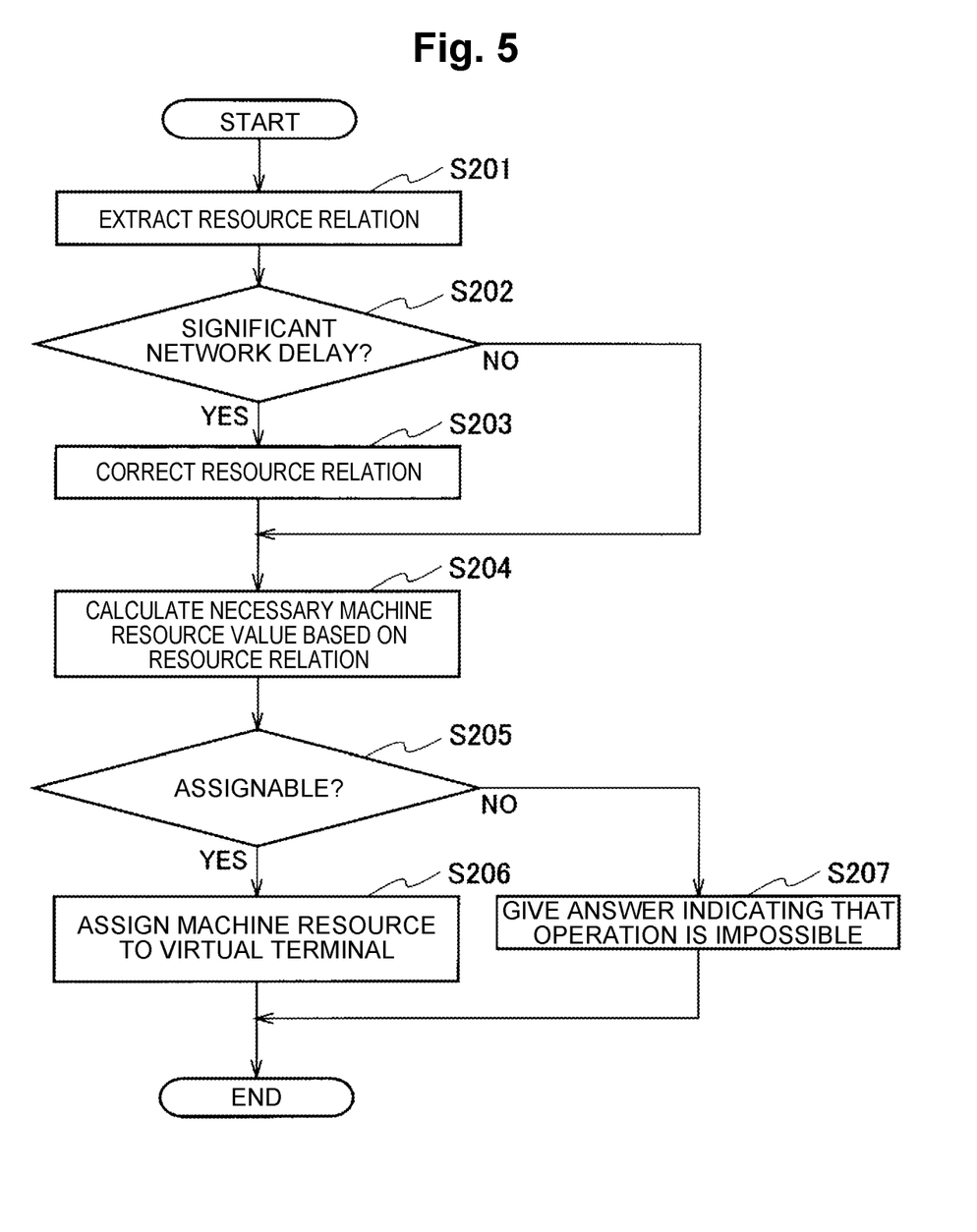
FIG. 5 is a diagram showing a processing flow of a resource estimation and assignment method.

FIG. 5 is a diagram showing a processing flow of a resource estimation and assignment method that is performed by the resource estimation device 1.

Step S201;

The resource estimation unit 230 extracts the resource relation information from the memory or the storage. In the resource relation information, information indicating the relation about change between the characteristic value of the 3D data about the object that is drawn by the VR application program and the machine resource value necessary to cause the virtual terminal to operate at the characteristic value is set for each VR image output scheme.

As the VR image output scheme, the resolution and the frame rate are used. The resource estimation unit 230 extracts the resource relation information corresponding to each resolution and each frame rate and indicating the relation about change between the characteristic value of the 3D data and the machine resource value necessary for the virtual terminal.

As the characteristic value of the 3D data, for example, the draw call number to which the VR application program performs call to a graphic driver, or the number (the number of vertexes) of primitives constituting the object that is drawn are used. Each of the draw call number and the primitive number is proportional to the number of objects that are drawn and the smoothness of each object.

As the machine resource value necessary for the virtual terminal, for example, the CPU clock number or the GPU utilization are used. Each of the CPU clock number and the GPU utilization increases depending on the draw call number and the primitive number.

A benchmark application program is used for grasping the relation about change between the characteristic value (the draw call number or the primitive number) of the 3D data and the necessary machine resource value (the CPU clock number or the GPU utilization). As the benchmark application program, an application program that can change the draw call number or the primitive number in stages is prepared. The relation about change can be grasped, for example, by appropriately setting the number of objects that are drawn and the primitive number, constructing a virtual terminal to which the machine resource is assigned, and causing the benchmark application to operate on the virtual terminal.

Figure 6:
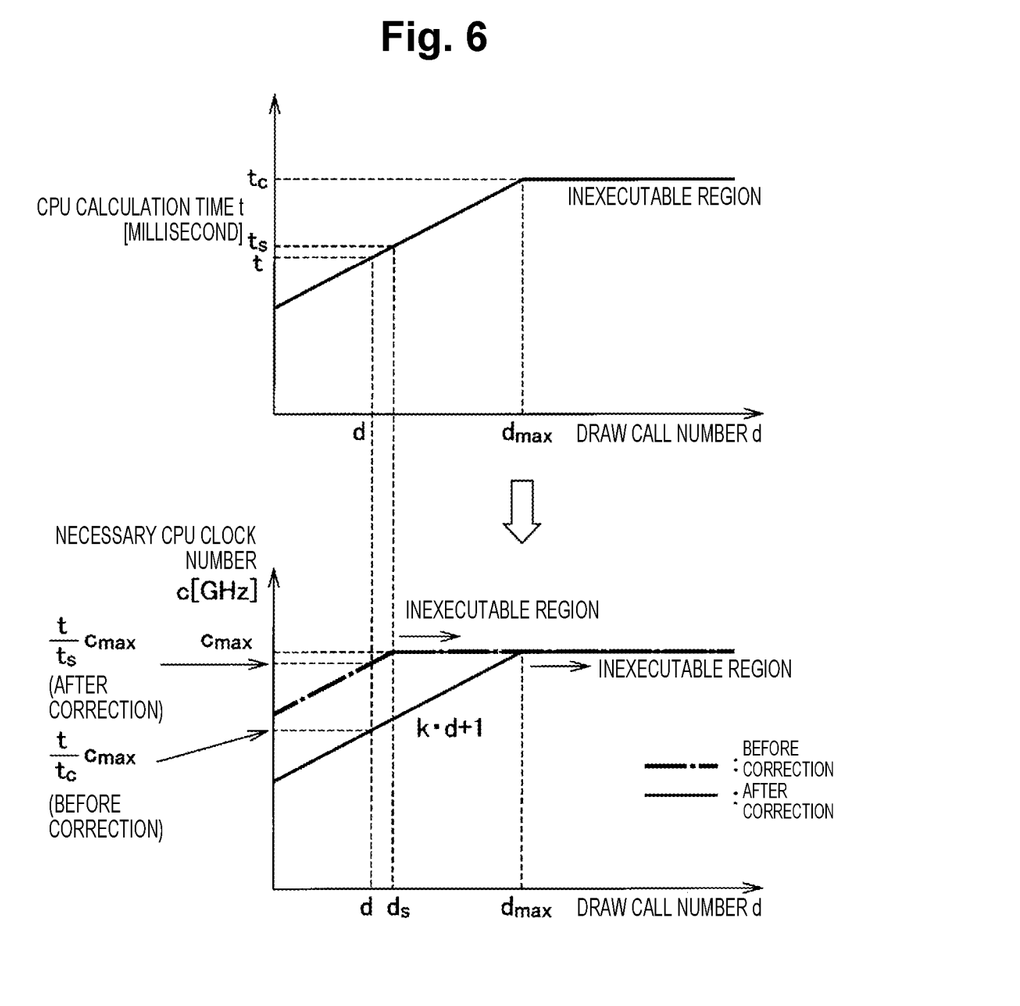
FIG. 6 is a diagram showing a calculation example of a resource relation.

A method for calculating the relation about change between a draw call number d and a necessary CPU clock number c will be described with reference to FIG. 6.

The change in a CPU calculation time t for drawing one VR image when the draw call number d is changed is sampled. At this time, the CPU calculation time t increases with the increase in the draw call number d. At a certain draw call number $d_{max}$, the CPU calculation time t reaches the performance limit of the CPU, and becomes constant. Alternatively, at the certain draw call number $d_{max}$, the CPU calculation time t exceeds a CPU calculation time for achieving a frame rate set at first. The CPU calculation time at this time is denoted by $t_c$ [millisecond]. When a maximal clock number of the CPU that is necessary is denoted by $c_{max}$ [GHz] and the CPU calculation time when the draw call number is d is denoted by t [millisecond], a combination of the draw call number d and the CPU clock number $(t/t_c) \cdot c_{max}$ [GHz] necessary at that time is obtained. The combination is defined as the relation between the draw call number and the CPU clock number.

Actually, it is difficult to measure the CPU calculation time with respect to all draw call numbers, and therefore, formulation is performed by linear approximation or the like. For example, in the above case, by the linear approximation, the CPU clock number c [GHz] necessary with respect to the draw call number d is expressed as $c = k \cdot d + l$ ($d \leq d_{max}$, k and l are constants). The mathematical expression is defined as the relation about change between the draw call number d and the necessary CPU clock number c. The range of $d_{max} < d$ is a range of the performance limit of the already-existing CPU included in the VR rendering server 200, and is treated as an inexecutable range.

A method for calculating the relation about change between the primitive number and the necessary GPU utilization will be described.

The relation between the primitive number and the GPU calculation time is extracted, by replacing the draw call number with the primitive number and replacing the CPU calculation time with the GPU calculation time in the above calculation method for the relation about change with the CPU. When the GPU calculation time at the GPU performance limit is denoted by $t_g$ [millisecond], the GPU utilization with respect to the GPU calculation time t [millisecond] when the primitive number is p is calculated as $(100 \cdot t)/t_g$ [%]. The inexecutable range is the same as that in the above-described calculation method for the relation about change with the CPU.

Step S202;

The relation correction unit 240 acquires the delay time in the communication network through which the VR rendering server 200 is connected with the VR terminal 100, from the NW delay measurement unit 220, and determines whether the acquired delay time is such a significant delay time that the above resource relation information needs to be corrected. For example, a predetermined permissible time is previously set in consideration of the delay time of a MTP delay for which an extra-delay property is required. Then, the relation correction unit 240 determines whether the acquired delay time is exceeding the permissible time. In the case where the acquired delay time is a significant delay time, the processing flow proceeds to step S203. In the case where the acquired delay time is not a significant delay time, the processing flow skips step S203, and proceeds to step S204.

Step S203;

In the case of a significant network delay, the relation correction unit 240 corrects the relation between the characteristic value of the 3D data and the machine resource value. In the example used for the description of step S201, the frame rate of a VR picture to be output is denoted by f [fps], and it is assumed that a network delay of $t_n$ [millisecond] is between the VR terminal 100 and the virtual terminal.

A correction method for the CPU clock number will be described with reference to FIG. 6.

The CPU calculation time necessary to realize the frame rate f [fps] for output is 1/f [millisecond], but is shortened to $t_s = (1/f) - t_n$ [millisecond] in the case of a network delay of $t_n$ [millisecond]. In the case where $t_s$ is less than $t_c$ [millisecond] that is the CPU calculation time at the above-described CPU performance limit, the correction is performed while a range where the CPU calculation time is more than $t_s$ [millisecond] is regarded as a range of the CPU performance limit. Specifically, when a draw call number at which the CPU calculation time is $t_s$ [millisecond] is denoted by $d_s$, the CPU clock number necessary with respect to the draw call number d is corrected from $(t/t_c) \cdot c_{max}$ [GHz] to $(t/t_s) \cdot c_{max}$ [GHz]. In the case of $t_c \leq t_s$, the correction is not performed. Further, a range of $d_s < d$ is newly treated as an inexecutable range.

A correction method for the GPU utilization will be described.

In the case of $t_s<t_c$, the GPU utilization with respect to the GPU calculation time t [millisecond] at the primitive number p is corrected from $(100 \cdot t)/t_g$ [%] to $(100 \cdot t)/t_s$ [%], by replacing the draw call number with the primitive number and replacing the CPU calculation time with the GPU calculation time in the above correction method for the CPU clock number. The process in the case of $t_c \leq t_s$ and the inexecutable range are the same as those in the correction method for the CPU clock number.

Step S204;

The resource estimation unit 230 calculates the machine resource value (the CPU clock number or the GPU utilization) corresponding to the VR image output scheme input by the VR viewer and the characteristic value (the draw call number or the primitive number) of the 3D data, using the resource relation information extracted in step S201 or the resource relation information corrected in step S203. For example, based on the resource relation, the resource estimation unit 230 calculates the CPU clock number corresponding to the draw call number of the VR application to operate, or calculates the GPU utilization corresponding to the primitive number of the VR application to operate.

Step S205;

The resource estimation unit 230 determines whether the calculated machine resource value can be assigned to the virtual terminal. In the case where the calculated machine resource value can be assigned to the virtual terminal, the processing flow proceeds to step S206. In the case where the calculated machine resource value cannot be assigned to the virtual terminal, the processing flow proceeds to step S207.

Step S206;

In the case where the calculated machine resource value can be assigned to the virtual terminal, the resource estimation unit 230 assigns the calculated machine resource value to the virtual terminal. For example, in the case where the calculated CPU clock number is smaller than that in the VR rendering server 200, the resource estimation unit 230 makes a determination of "operable", and performs the assignment to the virtual terminal. In the case where the calculated GPU utilization is less than 100% (for example, in the case where the calculated GPU utilization falls within a range where the GPU is not utilized), the resource estimation unit 230 makes a determination of "operable", and performs the assignment to the virtual terminal. Thereafter, the process ends.

Step S207;

In the case where the calculated machine resource value cannot be assigned to the virtual terminal, the resource estimation unit 230 gives an answer indicating that the VR application program cannot operate, to the VR viewer. For example, in the case where the calculated CPU clock number is larger than that in the VR rendering server 200, the resource estimation unit 230 makes a determination of "inoperable". In the case where the calculated GPU utilization is exceeding 100% (for example, in the case where the utilization resulting from adding the calculated GPU utilization to the GPU utilization in the current use is exceeding 100%), the resource estimation unit 230 makes a determination of "inoperable". Thereafter, the process ends.

As described above, according to the embodiment, in the resource estimation device 1 that estimates the resource necessary for the virtual terminal, the resource estimation device 1 being installed at the edge of the cloud, the virtual terminal performing the rendering of the VR image, the resource estimation device 1 includes: the resource estimation unit 230 configured to calculate the resource value corresponding to the VR image output scheme and the characteristic value of the 3D data, using the resource relation information, the resource value being necessary to cause the virtual terminal to operate at the characteristic value, the VR image output scheme being a scheme for outputting the VR image and being input, the 3D data being data about the object that is drawn by the VR application program, the resource relation information being set for each VR image output scheme and indicating the relation about change between the characteristic value and the resource value, and configured to calculate the calculated resource value as the resource necessary for the virtual terminal; and the relation correction unit 240 configured to alter the resource value included in the resource relation information, depending on a predetermined delay time in the communication network between the resource estimation device 1 and the VR terminal 100, when the communication network has the delay time, and therefore, it is possible to provide the technology allowing the estimation of the resource of the machine that performs the rendering of the VR image. That is, in the case where the edge cloud environment is provided for the purpose of the real-time VR rendering, it is possible to estimate whether the rendering of assumed viewing contents can be performed by the machine resource already provided in the edge cloud, and estimate the machine resource to be consumed.

The present invention is not limited to the above embodiment. In the present invention, various modifications can be made in the scope of the spirit of the present invention.

Figure 7:
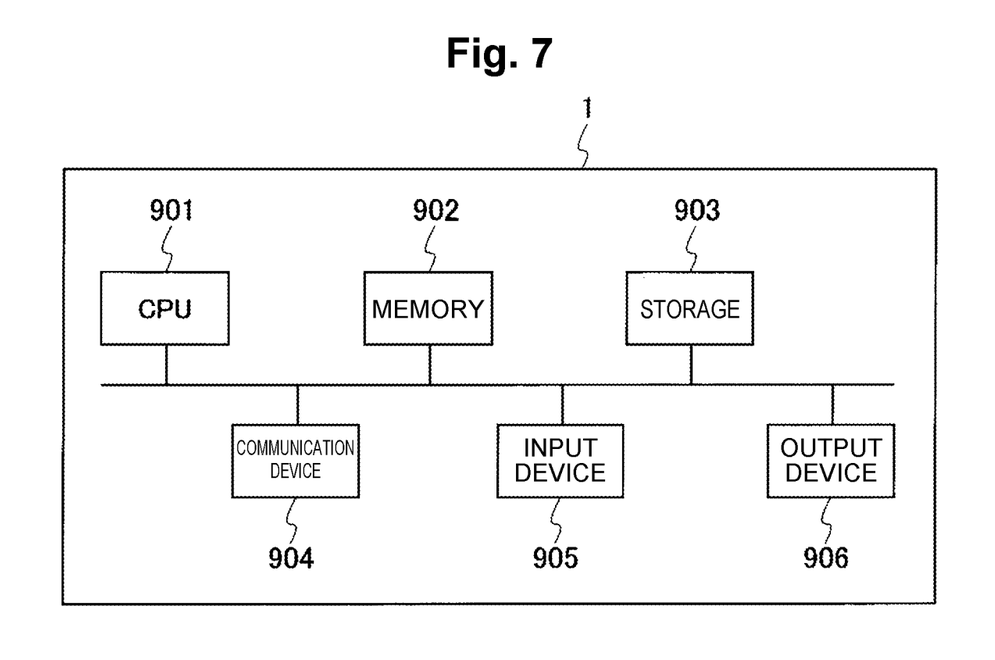
FIG. 7 is a diagram showing a hardware configuration of the resource estimation device.

The above-described resource estimation device 1 in the embodiment can be realized using a general-purpose computer system including a CPU (Central Processing Unit, Processor) 901, a memory 902, a storage 903 (HDD: Hard Disk Drive, SSD: Solid State Drive), a communication device 904, an input device 905 and an output device 906, as shown in FIG. 7. The memory 902 and the storage 903 are storage devices. In the computer system, the CPU 901 executes a predetermined program loaded on the memory 902, so that each function of the resource estimation device 1 is realized.

Further, the resource estimation device 1 may be implemented in a single computer. The resource estimation device 1 may be implemented in a plurality of computers. The program for the resource estimation device 1 can be stored in a computer-readable recording medium such as an HDD, an SSD, a USB (Universal Serial Bus) memory, a CD (Compact Disk) and a DVD (Digital Versatile Disc). The program for the resource estimation device 1 can be delivered through a communication network.

REFERENCE SIGNS LIST

1 Resource estimation device
100 VR terminal
110 VR image display unit
120 Displacement information acquisition unit
130 Communication interface unit
200 VR rendering server
210 VR rendering unit
220 NW delay measurement unit
230 Resource estimation unit
231 Relation extraction unit
240 Relation correction unit
250 Communication interface unit
300 Control server
310 Virtual terminal management unit 320 Communication interface unit
901 CPU
902 Memory
903 Storage
904 Communication device
905 Input device
906 Output device

The invention claimed is:

1. A resource estimation device that estimates a resource necessary for a virtual terminal, the resource estimation device being installed at a network system end of a communication network system, the virtual terminal performing rendering of a Virtual Reality (VR) image, the resource estimation device comprising:
 a processor; and
 a memory device storing instructions that, when executed by the processor, configure the processor to:
 calculate a central processing unit (CPU) clock number corresponding to a VR image output scheme and a draw call number of 3D data, using resource relation information, the CPU clock number being necessary to cause the virtual terminal to operate using the draw call number, the VR image output scheme being a scheme for outputting the VR image, the 3D data being data about an object that is drawn by a VR application program, the resource relation information being set for each VR image output scheme and indicating a linear relation between the draw call number and the CPU clock number, and obtain the calculated CPU clock number as the resource necessary for the virtual terminal; and
 increase the CPU clock number included in the resource relation information, depending on a predetermined delay time in a communication network through which the resource estimation device is connected to a VR terminal, when the communication network has the predetermined delay time.

2. The resource estimation device according to claim 1, wherein the VR image output scheme is a scheme relevant to a resolution or a frame rate.

3. A resource estimation method for estimating a resource necessary for a virtual terminal, the virtual terminal performing rendering of a Virtual Reality (VR) image, the resource estimation method comprising:
 calculating a central processing unit (CPU) clock number corresponding to a VR image output scheme and a draw call number of 3D data, using resource relation information, the CPU clock number being necessary to cause the virtual terminal to operate using the draw call number, the VR image output scheme being a scheme for outputting the VR image, the 3D data being data about an object that is drawn by a VR application program, the resource relation information being set for each VR image output scheme and indicating a linear relation about change between the draw call number and the CPU clock number, and obtaining the calculated CPU clock number as the resource necessary for the virtual terminal; and
 increasing the CPU clock number included in the resource relation information, depending on a predetermined delay time in a communication network through which a resource estimation device is connected to a VR terminal, when the communication network has the predetermined delay time.

4. A non-transitory computer readable medium that causes a computer to operate as the resource estimation device according to claim 1.

5. A non-transitory computer readable medium that causes a computer to operate as the resource estimation device according to claim 2.

* * * * *